(12) United States Patent
Sasaki et al.

(10) Patent No.: US 6,810,578 B1
(45) Date of Patent: Nov. 2, 2004

(54) METHOD OF MANUFACTURING THIN FILM MAGNETIC HEAD WITH IMPROVED PERFORMANCE

(75) Inventors: Yoshitaka Sasaki, Yokohama (JP); Atsushi Iijima, Saku (JP); Kazumasa Fukuda, Komoro (JP)

(73) Assignee: TDK Corporation, Tokyo (JP)

( * ) Notice: Subject to any disclaimer, the term of this patent is extended or adjusted under 35 U.S.C. 154(b) by 276 days.

(21) Appl. No.: 09/650,690

(22) Filed: Aug. 30, 2000

Related U.S. Application Data (62) Division of application No. 09/103,394, filed on Jun. 24, 1998, now Pat. No. 6,163,436.

(30) Foreign Application Priority Data

Nov. 19, 1997 (JP) .............................................. 9-317817

(51) Int. Cl.[7] ........................... G11B 5/127; H04R 31/00
(52) U.S. Cl. ................................ 29/603.15; 29/603.14; 29/603.07; 29/603.23
(58) Field of Search ......................... 29/603.14, 603.07, 29/603.23, 603.24, 603.15

(56) References Cited

U.S. PATENT DOCUMENTS

| | | |
|---|---|---|
| 4,404,609 A * | 9/1983 | Jones, Jr. .................... 360/126 |
| 4,589,042 A | 5/1986 | Anderson et al. |
| 5,828,533 A | 10/1998 | Ohashi et al. |
| 5,831,801 A | 11/1998 | Shouji et al. |
| 5,872,693 A | 2/1999 | Yoda et al. |

FOREIGN PATENT DOCUMENTS

JP          62-245509          10/1987

* cited by examiner

*Primary Examiner*—Richard Chang
(74) *Attorney, Agent, or Firm*—Oliff & Berridge, PLC

(57) ABSTRACT

A method of manufacturing a thin film magnetic head. The method includes forming, near a pole portion: a first magnetic layer supported by a base substrate; a first insulating layer on the first magnetic layer with an end edge which forms a reference position for an air bearing surface; a gap layer on the pole portion of the first magnetic layer and the first insulation layer; a second magnetic layer that extends to a region beyond the pole portion; a thin film coil isolated by a second insulation layer located above the first insulation layer; a third magnetic layer on the second insulation layer. The air bearing surface is formed by grinding in part an end face of the pole portion of the first magnetic layer and an end face of the pole portion of the second magnetic layer and the gap layer placed therebetween.

6 Claims, 12 Drawing Sheets

RELATED ART

RELATED ART

RELATED ART

FIG. 4a FIG. 4b

RELATED ART

FIG. 5a FIG. 5b

RELATED ART

FIG. 6a FIG. 6b

RELATED ART

FIG_7a  FIG_7b

RELATED ART

FIG_8a  FIG_8b

RELATED ART

FIG_9a  FIG_9b

RELATED ART

FIG_10

RELATED ART

FIG_11

RELATED ART

FIG. 12

RELATED ART

FIG_18a     FIG_18b

FIG_19

FIG_20

FIG_24a    FIG_24b

FIG_25

FIG_26a   FIG_26b

FIG_27

METHOD OF MANUFACTURING THIN FILM MAGNETIC HEAD WITH IMPROVED PERFORMANCE

This application is a Divisional of Ser. No. 09/103,394 filed on Jun. 24, 1998 now U.S. Pat. No. 6,163,436.

BACKGROUND OF THE INVENTION

1. Field of the Invention

The present invention relates to a thin film magnetic head and a method of manufacturing the same, and more particularly to a composite type thin film magnetic head constructed by stacking an inducting type writing magnetic transducing element and a magnetoresistive type reading magnetic transducing element, particularly a technique for improving a performance of a thin film writing magnetic head.

2. Description of the Related Art

Recently a surface recording density of a hard disc device has been improved, and it has been required to develop a thin film magnetic head having an improved performance accordingly.

The composite type thin film magnetic head has a structure for stacking a recording head intended for the writing and a reproducing head intended for the reading out, and a magnetoresistive element has been widely used in order to improve the performance of the reproducing head.

In general, as such a magnetoresistive element, the element utilizing anisotropic magnetoresistive (AMR) effect has been used so far, but there has been further developed a GMR reproducing element utilizing a giant magnetoresistive (GMR) effect having a resistance change ratio higher than the normal anisotropic magnetoresistive effect by several times. In the present specification, elements exhibiting a magnetoresistive effect such as these AMR and GMR reproducing elements are termed as a magnetoresistive reproducing element or MR reproducing element.

By using the AMR reproducing element, a very high surface recording density of several gigabits per a unit square inch has been realized, and a surface recording density can be further increased by using the GMR element. By increasing a surface recording density in this manner, it is possible to realize a hard disc device which has a very large storage capacity of more than 10 gigabytes and is still small in size. A height (MR Height: MRH) of a magnetoresistive reproducing element is one of factors which determine a performance of a reproducing head including a magnetoresistive reproducing element. The MR height MRH is a distance measured from an air bearing surface on which one end face of the magnetoresistive reproducing element is exposed to the other edge of the element remote from the air bearing surface. During a manufacturing process of the magnetic head, a desired MR height MRH can be obtained by controlling an amount of polishing the air bearing surface.

At the same time, a performance of a recording head is also required to be improved, in accordance with improvement of performance of the reproducing head. In order to increase a surface recording density, it is en necessary to make a track density on a magnetic record medium as high as possible. For this purpose, a width of a write gap at the air bearing surface has to be reduced to a value within a range from several micron meters to several sub-micron meters. In order to satisfy such a requirement, the semiconductor manufacturing process has been adopted for manufacturing the thin film magnetic head.

One of factors determining a performance of an inductive type thin film writing magnetic head is a throat height TH. This throat height TH is a distance of a pole portion measured from the air bearing surface to an edge of an insulating layer which serves to separate a thin film coil from the air bearing surface. It has been required to shorten this distance as small as possible. The reduction of this throat height is also decided by the amount of grinding from the air bearing surface. Therefore, in order to improve the performance of the thin film magnetic recording head, it is important that the recording head and the reproducing head are formed with best balance.

Figure 10:
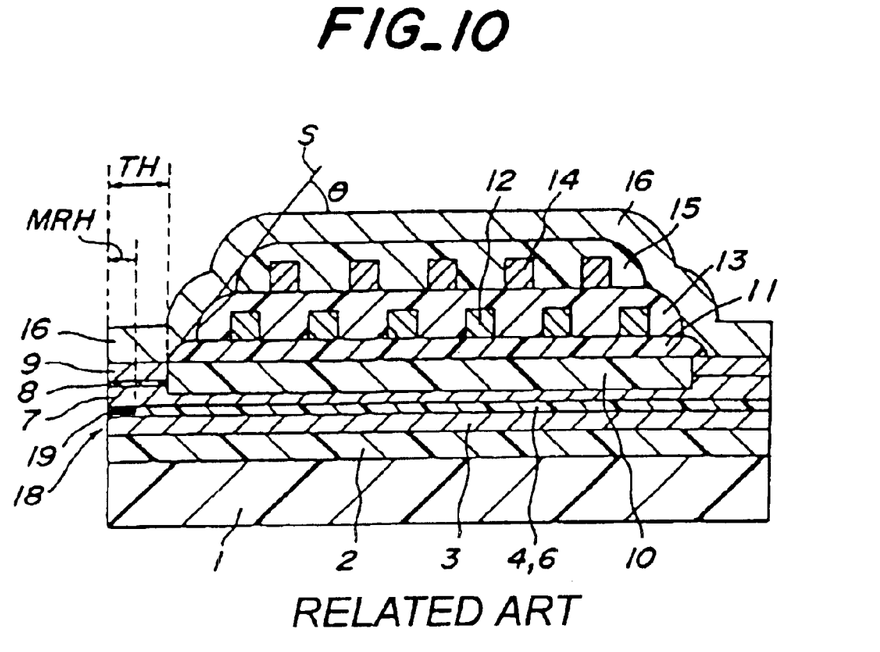
FIG. 10 is a cross-sectional view normal to the air bearing surface of the conventional completed thin film magnetic head.
Figure 11:
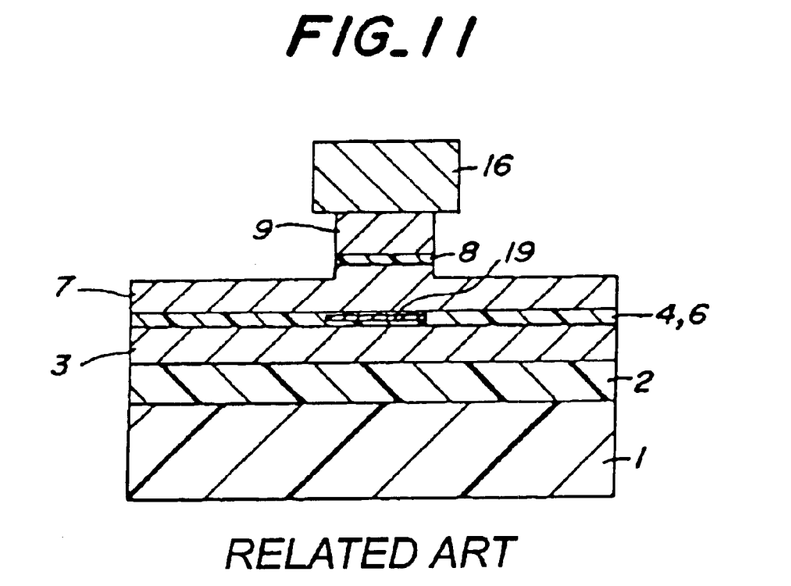
FIG. 11 is a parallel cross-sectional view parallel to the air bearing surface of the magnetic pole section of the conventional completed thin film magnetic head.
Figure 12:
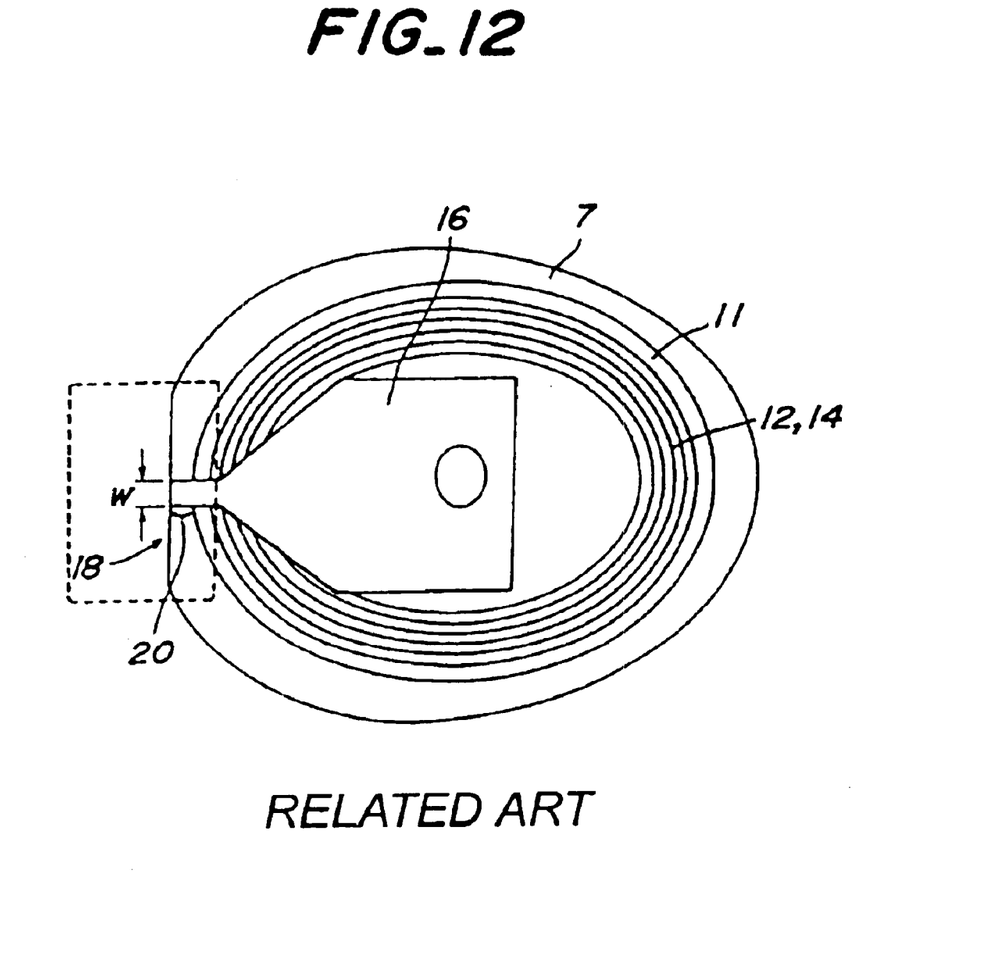
FIG. 12 is a plan view of the conventional completed thin film magnetic head.

FIGS. 1a, 1b–9a, and 9b are cross-sectional views vertical to the air bearing surface showing the successive manufacturing steps of a conventional standard thin film magnetic head, and a cross sectional view in which the magnetic pole section is cut in parallel to the air bearing surface. Moreover FIGS. 10–12 are a cross-sectional view of the entire conventional completed thin film magnetic head a cross-sectional view of the magnetic pole section, and a plan view of the entire thin film magnetic head, respectively. Moreover, the thin film magnetic head of this embodiment is a composite type thin film magnetic head formed by stacking the induction type thin film writing magnetic head and the MR reproduction reading element.

Figures 1A, 1B:
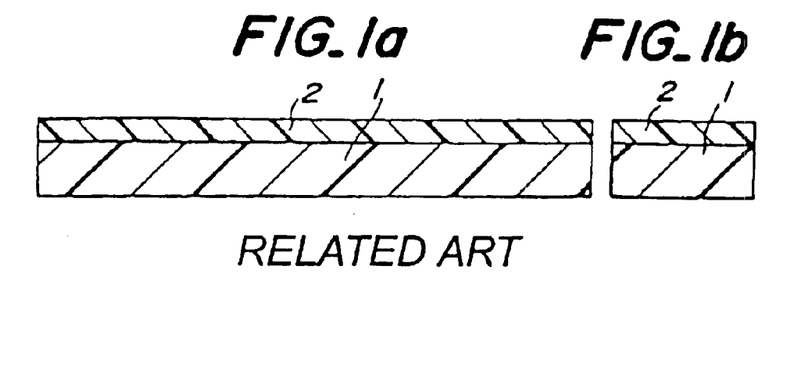

First of all, as shown in FIGS. 1a and 1b, an Insulation layer 2 consisting of for example alumina ($Al_2O_3$) is deposited on a basic substrate consisting of non-magnetic and electrical insulation material for example, such as AlTiC with a thickness of about 5–10 $\mu$m.

Figures 2A, 2B:
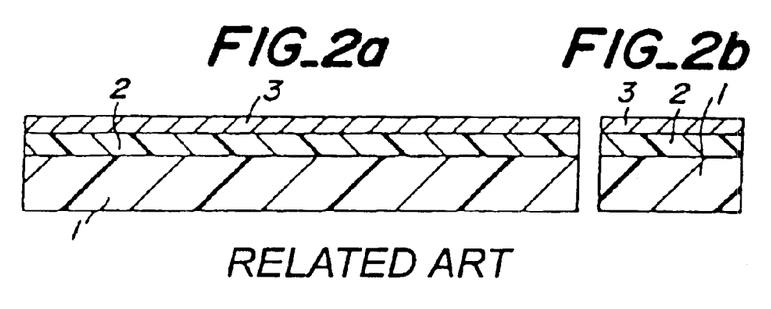

Next, as shown in FIGS. 2a and 2b, a lower shield layer 3 which composes a magnetic shield protecting the MR reproduction element of the reproducing head from the influence of the external magnetic field, is formed with the thickness of 3 $\mu$m.

Figure 3A:
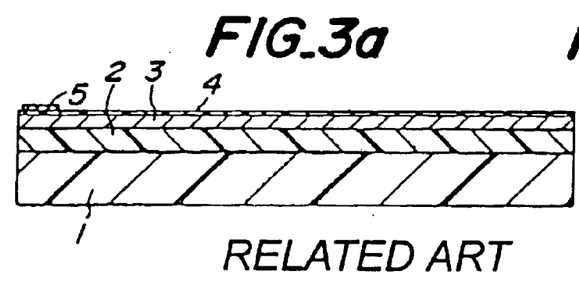
Figure 3B:
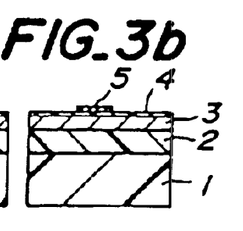

Afterwards, as shown in FIGS. 3a and 3b after spattering and depositing alumina as a shield gap layer 4 of a thickness of 100–150 nm, a magnetic resistance layer 5 consisting of a material with the effect of magnetic resistance and composing the MR reproduction element is formed on the shield gap layer with a thickness of tens nano meter, thereby making high precise mask alignment.

Figure 4A:
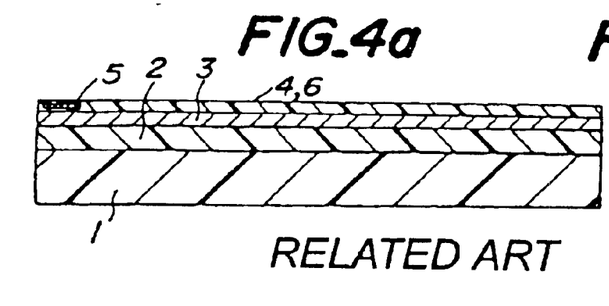
Figure 4B:
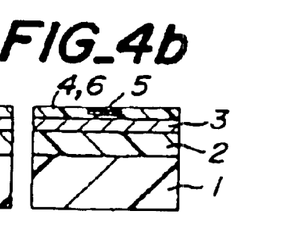

Then as shown in the FIG. 4, again, a shield gap layer 6 is formed so that the magnetic resistance layer 5 is embedded in the shield gap layers 4 and 6.

Figure 5A:
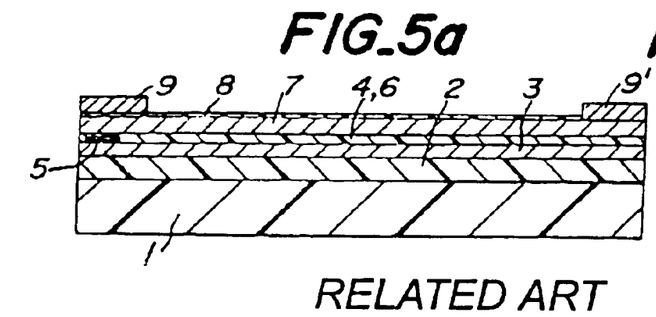

Next, as shown in the FIG. 5, a magnetic layer 7 consisting of permalloy is formed with the film thickness of 3 $\mu$m. This magnetic layer 7 has not only a function of the upper shield layer which magnetically shields the MR reproduction element together with the above described lower shield layer 3, but also has a function of a lower magnetic layer of the thin film magnetic writing head. Herein, for convenience sake of the explanation, this magnetic layer 7 is called as a first magnetic layer by paying attention to it a magnetic layer composing a writing magnetic head.

Then, on the first magnetic layer 7, after a light gap layer 8 consisting of non-magnetic material, for example alumina is formed with film thickness of about 200 nm, a second magnetic layer 9 consisting of material with high saturation magnetic flux density such as, for example, permalloy (Ni: 50 wt %, Fe: 50 wt %) and nitride iron (FeN) is formed with a desired shape by high precise mask alignment.

Second ma molded in a given shape is called a pole chip, and the width of the track is defined as a width W.

In this case, when a dummy pattern 9' for connecting a lower pole (first magnetic layer) and an upper pole (third magnetic layer), which is formed latter, are formed simultaneously, it is possible to make an opening for through-hole after a polishing or chemistry-mechanical (CMP).

Figure 5B:
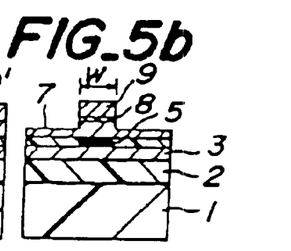

In order to prevent a width of effective writing track from being widened, that is, in order to prevent a magnetic flux from being widened in the lower pole at the data writing, also a gap layer 8 in surroundings of the pole chip 9 and the lower pole 7 (first magnetic layer) are etched by an ion beam etching, such as, ion miring. Even though its state is shown in FIG. 5*b*, this structure is called as a trim, and this portion becomes a magnetic pole section in the first magnetic layer.

Figure 6A:
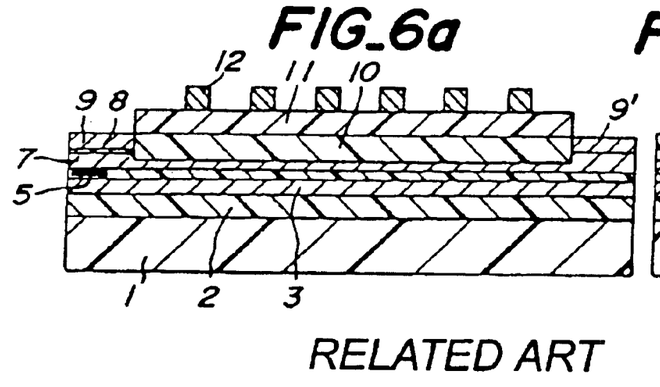
Figure 6B:
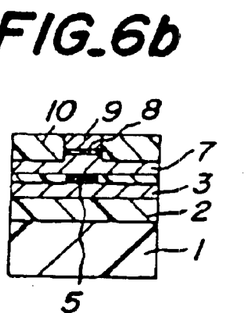

Next, as shown in FIGS. 6*a* and 6*b*, after an insulating layer, for example, alumina film 10 is formed with the thickness of about 3 μm, the whole is, for example, made smooth by CMP.

Subsequently, after forming a photoresist layer 11 of electrical insulation to a given pattern by the mask alignment of high precision, a thin film coil 12 as the first layer consisting, for example, of copper is formed on the photoresist layer 11.

Figures 7A, 7B:
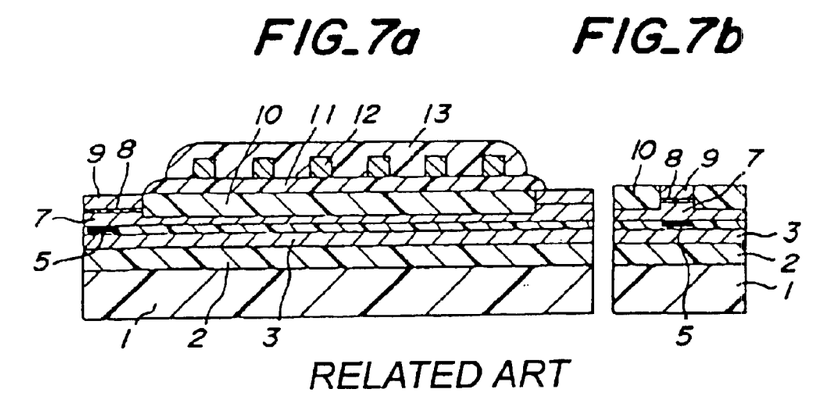

Continuously, as shown in FIGS. 7*a* and 7*b*, after forming an insulating photoresist layer 13 is formed on the thin film coil 12 by the mask alignment of high accuracy again, in order to make the surface smooth, the calcining (baking) processing is given with the temperature of for example 250–300° C.

Figures 8A, 8B:
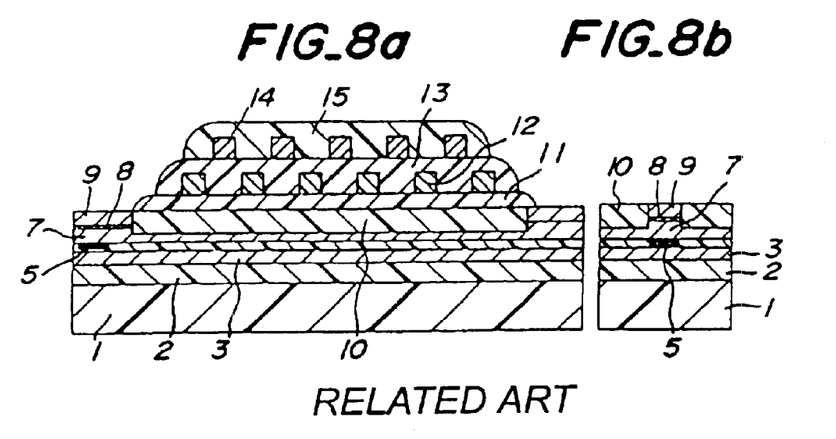

In addition, as shown in FIGS. 8*a* and 8*b*, the thin film coils 14 as the second layer are formed on the smoothed surface of this photoresist layer 13. Next, after forming a photoresist layer 15 with highly accurate mask alignment on the thin film coils 14 as this second layer, in order to make the surface smooth again, the calcining (baking) processing is given with the temperature of for example 250° C.

As described above, the reason why photoresist layers 11, 13 and 15 are formed with m alignment of high accuracy, is that throat height and MR height are defined by a reference position at the end edge of the magnetic pole section side of the photoresist layer.

Figures 9A, 9B:
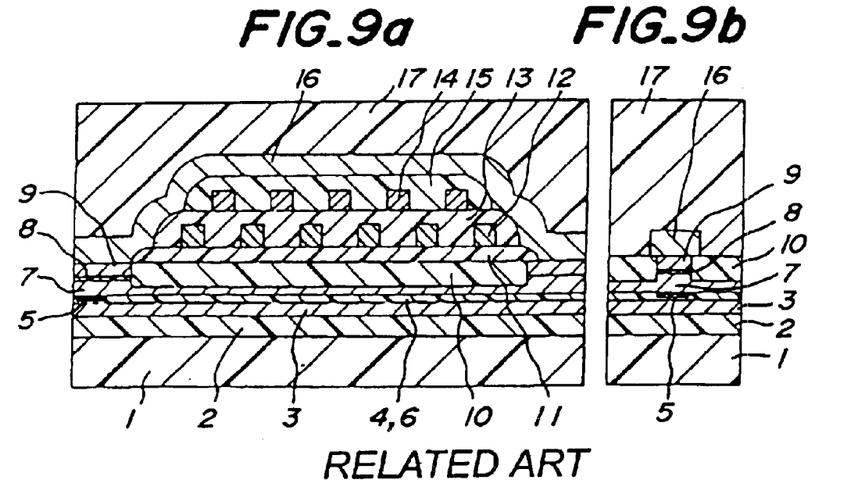

Next, as shown in FIGS. 9*a* and 9*b*, a third magnetic layer 16 consisting of for example permalloy is selectively formed on the second magnetic layer 9 (pole chip) and the photoresist layers 11, 13 and 15 with the thickness of 3 μm according to desired pattern.

This third magnetic layer 16 comes in contact with the first magnetic layer 7 at a rear position away from the magnetic pole section through a dummy pattern 9', thin film coil 12, 14 is extended through a closed magnetic circuit composed by the 1st, 2nd and 3rd magnetic layers.

In addition, an overcoat layer 17 consisting of alumina deposited from the exposed surface of the third magnetic layer 16.

Finally, the side surface forming the magnetic resistance layer 5 and the gap layer 8 is ground, thereby forming an air bearing surface (ABS) 18 opposite to the magnetic record medium, Magnetic resistance layer 5 is also ground in the formation process of this air bearing surface 18, and thus, MR reproduction element 19 is obtained. In this way, the above described throat height TH and the MR height MRH are decided. Its appearance is shown in FIG. 10. In an actual thin film magnetic head, the conductor and the point of contact pad for performing electrical connection for the thin film coils 12, 14 and a MR reproduction element 19 are formed, but this is not shown.

As shown in FIG. 10, an angle θ between line segments S connecting corners of side surfaces of photoresist layers 11,13,15 for isolating the thin film coils 12,14 and an upper surface of the third magnetic layers 16 is called as an apex angle thereby becoming an important factor for deciding a performance of the thin film magnetic head together with the above described throat height TH and MR height.

Moreover, as shown in FIG. 12 by the plane, a width W of the magnetic pole section 20 between the second magnetic layer 9 and the 3rd magnetic layer 16 is made narrow, and the width of the track recorded in the magnetic record medium is defined by this width, so that it is necessary to narrow this width W as much as possible to achieve a high surface recording density. Moreover, in this FIG. 12, for the shake's of convenience of drawing, the thin film coils 12, 14 are made concentric circle.

Well, in forming conventional thin film magnetic head, especially, the problem is that after forming the coil, the coil section covered with the photoresist insulation layer and risen in the mountain shape, especially, it is a difficulty of a fine formation of the upper pole (yoke pole) formed along the inclined part (Apex). That is, the hitherto, in case of forming the upper pole, after plating the material for the upper pole such as permalloy on the mountain shaped coil with the height of about 7–10 μm, the photoresist is spread with the thickness of 3–4 μm, after which a given pattern is formed by using the photolithography technology. Herein, If 3 μm or more is necessary as the film thickness of resist that the patterning is performed by the register strike on the mountain shaped coil, the photoresist of the about 8–10 μm thickness will be spread under the inclined portion.

One the one hand, in the upper pole formed on the write gap layer which is formed on the surface and the smooth surface of a certain mountain shaped coil section having de height difference of about such 10 μm, it is necessary to form the narrow track of the recording head near the edge in the photoresist insulation layer (11, 13 of for example FIG. 7). Therefore, it is necessary to form the pattern of the width of 1 μm with the photoresist film of thickness of 8–10 μm.

However, even if the narrow width pattern of 1 μm level is formed with a photoresist film as thick as 8–10 μm, in case of exposing the photolithography, the pattern crumble or the like due to the reflection of light is generated, and the decrease in the resolution is forced due to the thick resist, so that it is extremely difficult to form a top pole for forming the narrow track by the patterning with accuracy.

Then, as is shown in the above conventional embodiment, assuming that data is written with the pole chip capable of forming the narrow track width of the recording head, after forming this pole chip, by adopting a method of connecting the upper pole to this pole chip, in other words, by adopting a structure divided into two, that is, a pole chip for determining the track width and an upper pole for inducing magnetic flux, the above problem has been advantageously improved.

However, in the thin film magnetic head formed as in the above, particularly, in the recording head, the problem described as follows was left now as in the past.

(1) The contact area of a pole chip and an upper pole is small, moreover, the contact portion touches it vertically, so that it is easy to saturate magnetic flux with the part, therefore, the writing characteristic of satisfying enough is not obtained.

(2) Throat height TH and MR height MRH are decided based on the edge on the pole portion side of the insulating layer which insulating separates the thin film coil, but the insulating layer is weak to heat since it is usually formed with a photoresist organic insulating layer.

Therefore, it melts by heating about 250° C. added when the thin film coil is formed or softens, and the pattern size of the insulating layer changes, and the size of throat height TH and MR height MRH might shift from the design value of the desire.

(3) The positional relation of a poles and an upper pole is decided by alignment at photolithography, so that as seen from the air bearing surface, this positional relation is shifted to one side greatly, but in case, at a writing is performed even in the upper pole and thus the effective track width is widened. Therefore, the malfunction of writing the data in the place other than in the hard disk board to be recorded originally, is generated.

SUMMARY OF THE INVENTION

An object of the present invention is to achieve the above problems with effectively and to provide a thin film magnetic head in which the contact area of a pole chip and an upper pole is effectively expanded, and the saturation of the magnetic flux at the magnetic pole section worried at the hitherto is completely canceled, and its effective manufacturing method.

Also, another object of the present invention is to a thin film magnetic head in which the pattern of the insulation layer as a standard at the position to the air bearing surface does not melt by heat-treating about 250° C. added at the time of forming the thin film coil, and thus, the throat height TH and MR height can be obtained as the desired design value with stability, and its effective manufacturing method.

Moreover, other object of the present invention is to provide a thin film magnetic head in which widening of the width of the effective track and the decrease in the yield or the like were also canceled, and its manufacturing method.

According to the present invention, there is provided a thin film magnetic head comprising: a first magnetic layer having a pole portion opposite to a magnetic record medium, a second magnetic layer opposite to the magnetic record medium and having a pole portion with a width defining a width of a record track, for constructing an air bearing surface together with an end face of the pole portion and an end face of the pole portion of the first magnetic layer, a third magnetic layer contacted to the second magnetic layer at the side opposite to the first magnetic layer and magnetically coupled to the first magnetic layer at a rear position separated form the air bearing surface, a gap layer consisting of non-magnetic material inserted between the pole portion of the first magnetic layer and the pole portion of the second magnetic layer, a thin film coil having a portion supported between the first magnetic layer and the second and third magnetic layers the ate isolated by an insulating layer, and a base substrate for supporting the first, second and third magnetic layers, the gap layer, the insulating layer and the thin film coil, characterized in that the second magnetic layer is extended to the region after than the pole portion of the first magnetic layer along a part of the face at the side opposite to the first magnetic layer, of the insulating layer supported in the state isolating the thin film coil, thereby touching the second magnetic layer to the third magnetic layer at the extended region.

In a suitable embodiment of the thin film magnetic head according to the present invention, the width of second magnetic layer is widened at the region rear the pole portion.

In this case, the widened angle of the second magnetic layer at the region rear than the pole portion is 40~180°.

In addition, in the present invention, the second magnetic layer consists of substance having a high saturation flux density.

Also, the tip portion of the second magnetic layer is made backed up from the air bearing surface, so as not expose the touched portion of the third magnetic layer and the second magnetic layer on the air bearing surface. The distance backed up from the air bearing surface is made substantially 2–5 µm.

In addition, in the embodiment of the thin film magnetic head according to the present invention, the insulation layer where the end edge of the magnetic pole section side becomes a reference position to the air bearing surface is provided on the above first magnetic layer, the surface of this insulation layer is covered with the gap layer consisting of the above nonmagnetic material, and the above second magnetic layer is arranged along the surface opposite to the above insulation layer of this gap layer the above second magnetic layer.

Moreover, in the present invention, a magnetoresistive reading reproducing element insulated in electrically and shielded in magnetically is arranged so as to expose its end face on the above air bearing surface between the above basic substance and the first magnetic layer to construct a composite thin film magnetic head.

In addition, the manufacturing method of the thin film magnetic head according to the present invention comprising: step of forming a first magnetic layer having a magnetic pole section so as to support it by a basic substrate, a step of forming a first insulating layer having an end edge of the magnetic pole section side as a reference position for the air bearing surface, a step of forming a gap layer consisting of non-magnetic material on the magnetic pole portion in the above first magnetic layer and the above first insulation layer, a step of forming a second magnetic layer over the magnetic pole portion in the above first magnetic layer and the rear region therefrom on the gap layer, a step of forming a thin film coil supported in the state isolated with each other by the second insulation layer above the first insulating layer, a step of forming on the above second insulation layer a third magnetic layer coming in contact with the above second magnetic layer at the region rear rather than at least the magnetic pole portion, and coming in contact with the above first magnetic layer at a rear position away from the above air bearing surface, and a step of forming an air bearing surface opposed to the magnetic record medium by grinding the above basic substance, the magnetic pole portion of the first and second magnetic layers and the gap layer placed therebetween.

In a suitable embodiment of the manufacturing method of the thin film magnetic head according to the present invention, the above second magnetic layer is formed in such a manner that the width of a magnetic layer in a rear region is gradually expanded than the magnetic pole portion.

Moreover, in a suitable embodiment of the manufacturing method of the thin film magnetic head according to the present invention, before forming the gap layer where the above first magnetic layer consists at least of non-magnetic material on the magnetic pole portion, the insulation layer where the edge on the magnetic pole portion side becomes a reference position to the air bearing surface, is formed, and in case of forming the gap layer, the above insulation layer is covered with non-magnetic thin film which forms the gap layer.

Moreover, in the manufacturing method of the thin film magnetic head according to the present invention, a magnetoresistive reading reproducing element insulated in electrically and shielded in magnetically is arranged between the above basic substrate and the first magnetic layer to construct a composite thin film magnetic head.

In case of manufacturing such a composite type thin film magnetic head, the first shield layer for performing a magnetic shielding on the above basic substrate, the magnetic resistance material film is formed thereon while being embed in a fourth insulation layer, after which the above first magnetic layer also serving as the second shield layer is formed, and in the grinding step for forming the above air bearing surface, the above first shield layer is ground and the above magnetic resistance material film is ground, thereby forming a magnetoresistive reproducing element which exposes its end surface on the air bearing surface.

BRIEF EXPLANATION OF DRAWINGS

FIGS. 1a, 1b–9a, and 9b are cross-sectional views normal to the air bearing surface and cross-sectional views parallel to the air bearing surface in the successive manufacturing steps of a conventional standard thin film magnetic head;

FIGS. 13a, 13b–18a, and 18b are parallel cross-sectional views normal to the air bearing surface showing the successive manufacturing steps in one embodiment of the manufacturing method of the thin film magnetic head according to the present invention;

FIGS. 21a, 21b–24a, and 24b are cross-sectional views normal to the air bearing surface and cross-sectional views parallel to the air bearing surface showing the following steps of the same embodiment;

Figures 26A, 26B:
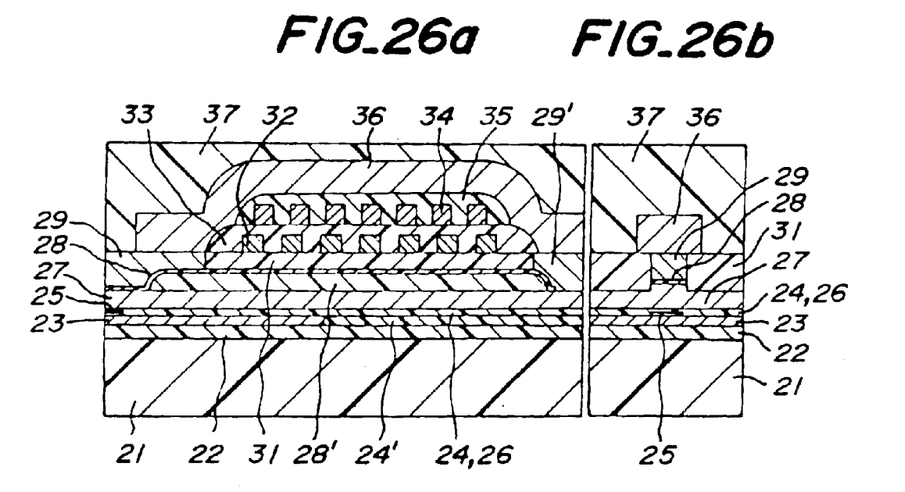
FIG. 26 is a cross-sectional view of the thin film magnetic head according to the completed present invention.
Figure 27:
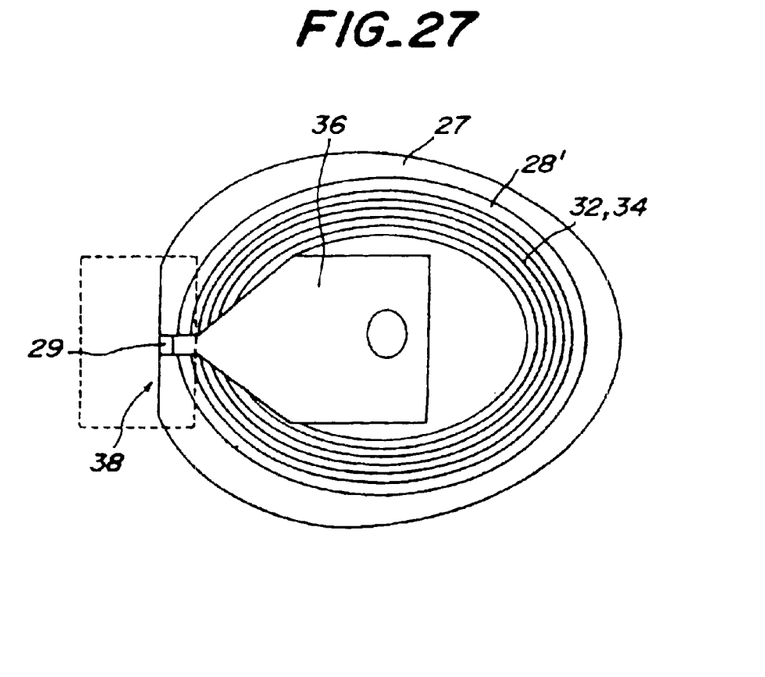
FIG. 27 is a plan view of the thin film magnetic head according to the completed present invention.

FIGS. 13–25 show the manufacturing procedures of the thin film magnetic head according to the present invention in step order, and FIG. 26, 27 show a cross-sectional view and a plane view of the thin film magnetic head of the completed present invention, respectively. Moreover, in these figures, a is a cross-sectional view normal to the air bearing surface, and b is a cross-sectional view by which the magnetic pole section is cut in parallel respect to the air bearing surface. This thin film magnetic head, moreover, is a composite type thin film magnetic head formed by stacking an induction type thin film reading magnetic head and the MR writing reproduction element.

Figures 13A, 13B:
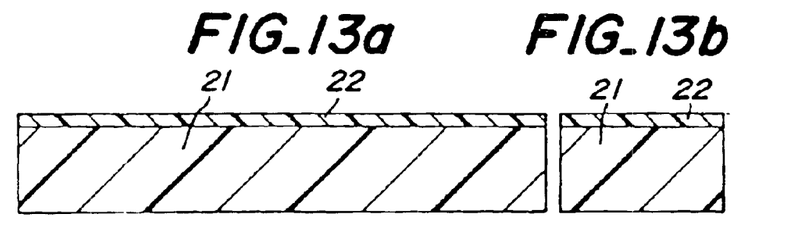

First of all, as shown in FIGS. 13a and 13b, an insulation layer 22 consisting of for example alumina ($Al_2O_3$) on basic substrate 21 with the thickness of about 3–5 µm.

Figure 14A:
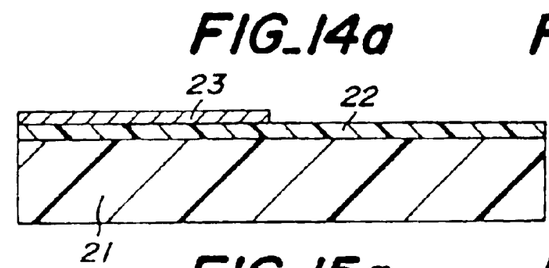
Figure 14B:
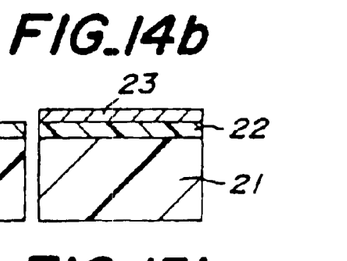

Next, as shown in FIGS. 14a and 14b, in order to form a lower shield layer 23, permalloy is selectively formed with the thickness of about 3 µM on an alumina insulation layer 22 by the use of the photoresist film as the mask and the sputtering method.

Figure 15A:
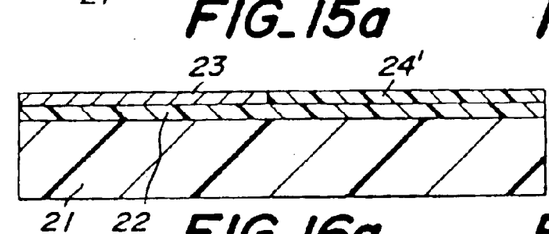
Figure 15B:
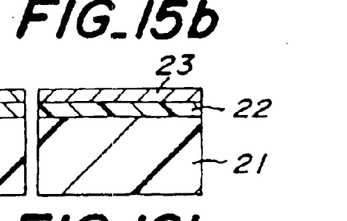
Figure 16A:
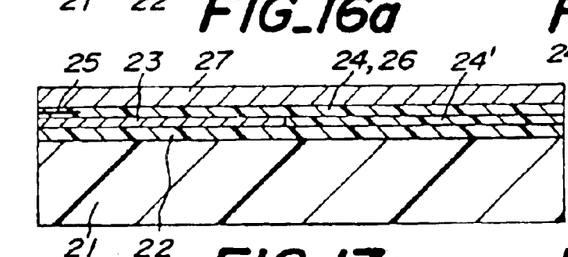
Figure 16B:
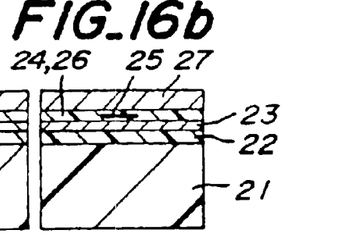

Next, as shown in FIGS. 15a and 15b, an insulating layer 24' of alumina is formed with the thickness of about 4–6 µm. After smoothing it by for example CMP, as shown in FIGS. 16a and 16b, alumina is posited with the thickness of 100–200 nm as a shield gap layer 24, next a magnetic resistance layer 25 composing the MR reproduction element is formed with the thickness of few tens nm, with the desired shape of mask alignment of high accuracy, a shield layer 26 is formed again. Thus, the magnetic resistance layer 25 shield gap layers 24 and is embedded.

Next, the first magnetic layer 27 is selectively formed with thickness of about 3–4 µm.

Afterwards, in order to eliminate a stepping level, after forming an alumina layer on the entire surface with 5–6 µm thickness, the surface of the first magnetic layer 27 in CMP is exposed, and the entire surface is made smooth, however, this alumina layer does not appear in the drawing.

Figure 17A:
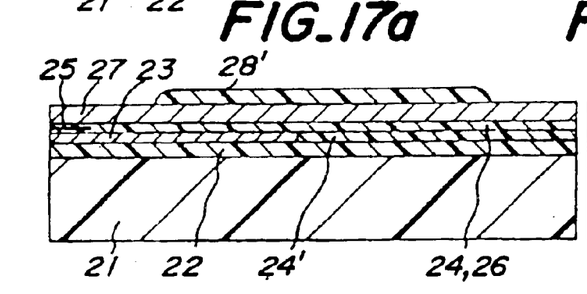
Figure 17B:
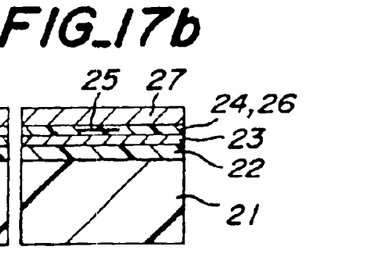
Figure 18A:
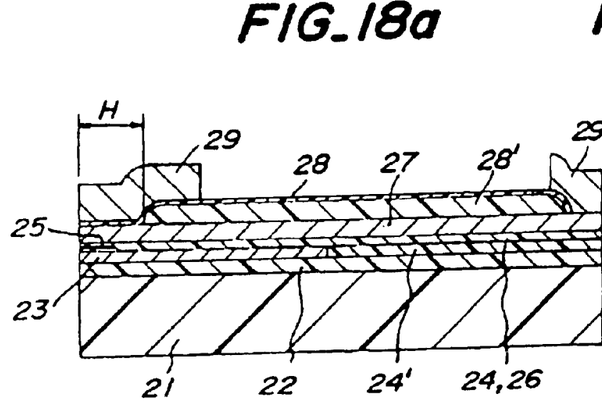
Figure 18B:
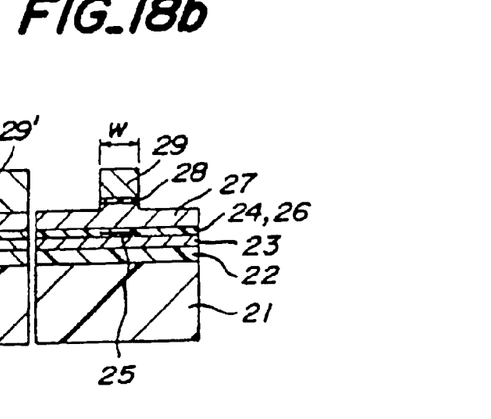

Next, as shown in FIGS. 17a and 17b, in order to decide a throat height TH and apex angle, after forming an insulation layer 28' is formed by photoresist with the thickness of 2–3 µm, as shown in FIGS. 18a and 18b, a write gap insulation layer 28 consisting of alumina is formed with 100–300 nm thickness.

Moreover, this embodiment shows the after the photoresist insulation layer 28' which is a reference position which the throat height TH and the apex angle are decided, is formed by the edge on the magnetic pole portion side, the write gap insulation layer 28 is formed, but the order of forming these insulating layers may be made opposite. That is, after write gap insulation layer 28 is formed, the photoresist insulation layer 28' may be formed. However, if after the photoresist insulation layer 28' is formed, the write gap insulation layer 28 is formed, and the surface of the photoresist layer 28' is covered with the alumina insulation layer 28, there is following advantages. That is, the throat height TH is defined as a distance between the edge and the air bearing surface on the magnetic pole portion side of the photoresist insulation layer 28', in an actual manufacturing process, the position of the edge of the insulation layer 28' is not seen, so that this edge is formed at the desired position, and the air bearing surface is ground so as to obtain the desired throat height TH by using this edge as a reference position.

On the other hand, in case of forming the thin film coil, afterwards, a heat-treating about 250° C. is performed, but the photoresist layer 28' composing the insulation layer is melt by this heating and thus the size of the pattern of the insulation layer is changed. Therefore, the above edge position of the photoresist insulation layer 28' is also changed, as a result, the size of the throat height TH which is the length of the magnetic pole portion in which this end is formed as a reference position, might also shift from the desired design value. Moreover, the MR height MRH defined as height of the magnetic resistance reproduction element from the air bearing surface is decided as well as the above described throat height TH depending on the amount of polishing in case of grinding the air bearing surface, but this grinding is performed by using the edge of the pole portion side of the photoresist insulating layer 28' as a reference position, so that if the edge position of the insulating layer is changed by heat-treating, MR height MRH is also changed, and thus it is not possible to perform the grinding according to the design value. In addition, when the photoresist layers 33 and 35 constituting the insulating layer for isolating the photoresist layer 28' and the thin film coil described later, are melt, it is fear that the apex angle θ defined by the inclination angle on the side of these insulating layers changes. The apex angle θ also influences on the characteristic of the thin film magnetic head, and the characteristic thereof often becomes defective by its change. Therefore, it is important to prevent the edge in the photoresist layer 28' constituting the insulating layer from changing treating about 250° C. added in case of forming the thin film coil shown in FIGS. 18*a*, and 18*b*, if after forming the photoresist insulating layer 28', an alumina insulating layer 28 of the write gap is formed, and the photoresist insulating layer 28' is covered with alumina insulating layer 28, the edge position of the photoresist layer 28' does not change by the above described heat-treating, so that in addition to the throat height TH, the photoresist insulating layer 28 can effectively control the gap from the desired design value of MR height MRH and the apex angle θ. Next, as shown in FIGS. 18*a* and 18*b*, a second magnetic layer 29 (pole chip), deciding the width W of the writing track is selectively formed with the thickness of about 1–4 μm. Afterwards, the write gap around the pole chip is opened selectively, the pole portion is formed for example by etching the exposed first magnetic layer 27 with ion milling. Moreover, in the present invention, the pole portion means as shown in FIG. 18*a* by H, a region, in which the first magnetic layer 27, the write gap 28, and the second magnetic layer 29 (pole chip) between the edge surface of the laminated layers and the edge of the photoresist insulating layer 28', are connect with the width W. Therefore, in the stage of the product, when the edge surface is ground and the air bearing surface is formed, the pole portion becomes a region from the edge of the photoresist insulating layer 28' to the air bearing surface.

Figure 19:
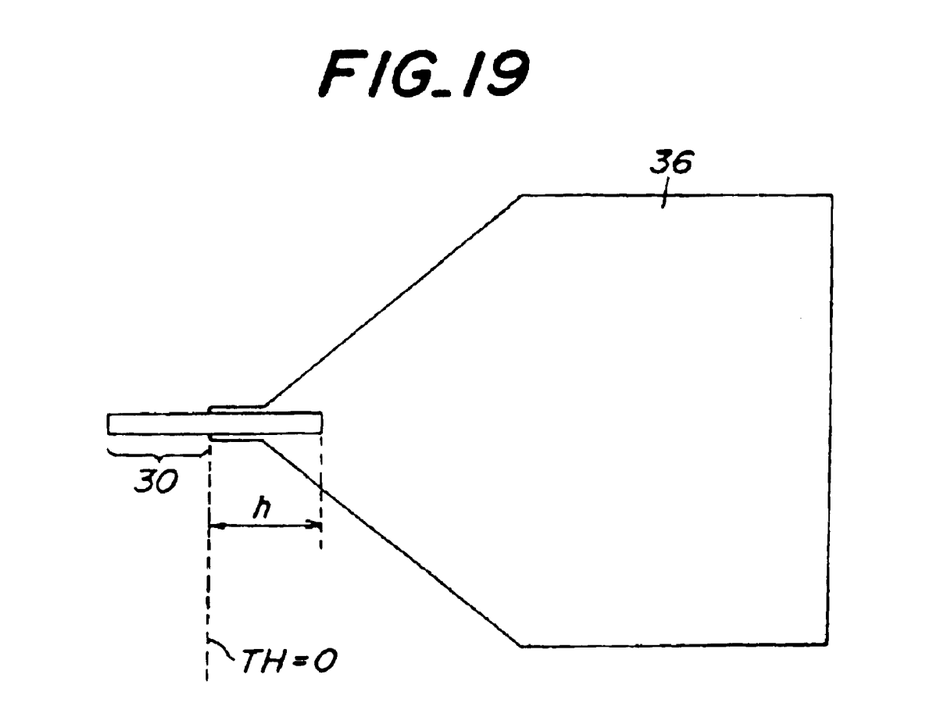
FIG. 19 is a plan view showing one embodiment of the shape of the second magnetic layer.

Well, in the present invention, in case of forming the above pole chip, as shown in FIG. 19, it is important to form a second magnetic layer 29 with not only pole portion 30, but also over a rear region widely. The reason thereof is that at the hitherto, in case of forming the second magnetic layer while touching the upper pole on the pole chip, the contact area of the pole chip and the upper pole is small, and the contact section touches it vertically, so that it is easy to saturate the magnetic flux in this portion, and thus, the writing characteristic of satisfying enough was not obtained; however, according to the present invention, the contact region of the pole chip and the upper pole is extended to not only the magnetic pole portion, but also a rear region therefrom, so that the fear of the saturation of such a magnetic flux can be effectively canceled, as a result, it comes to be able to obtain a satisfying enough a writing characteristic. Herein, when the contact area is secured enough, the contact region of a pole chip and an upper pole may be only as a rear region rather than that of the pole portion.

Moreover, in this specification, the rear direction means the direction opposite to the air bearing surface.

Figure 20:
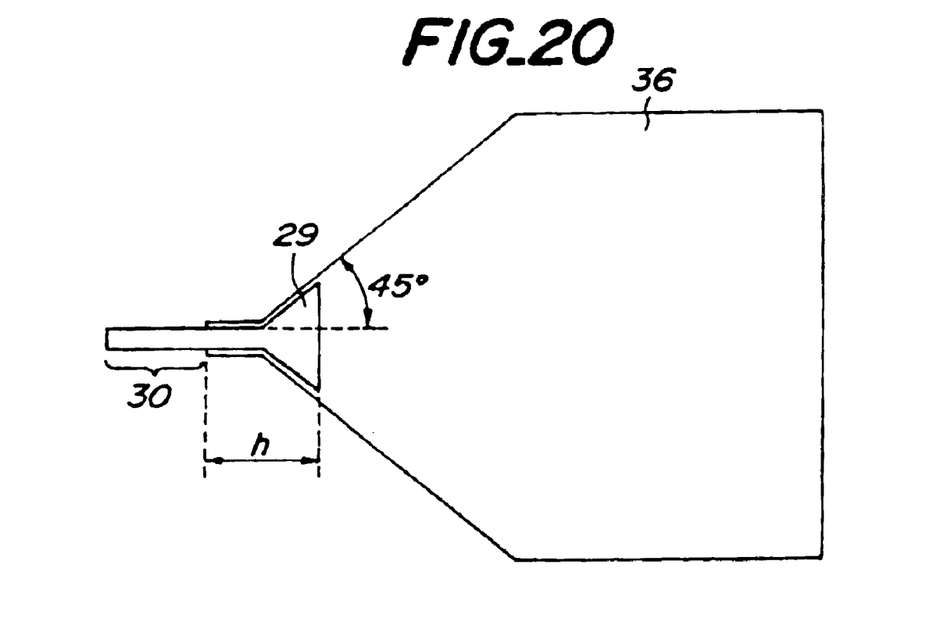
FIG. 20 is a plan view showing other embodiments of the shape of the second magnetic layer.

Herein, as to the shape of the pole chip in a rear region from the pole portion, a limitation is not present especially. That is, as shown in FIG. 19, if may be a shape postponed straight backward, and as shown in FIG. 20, it may be a shape which widened gradually while going backward. In short, the pole chip only has to come in contact from the pole portion in a rear region with an upper pole by an enough area.

Figures 21A, 21B:
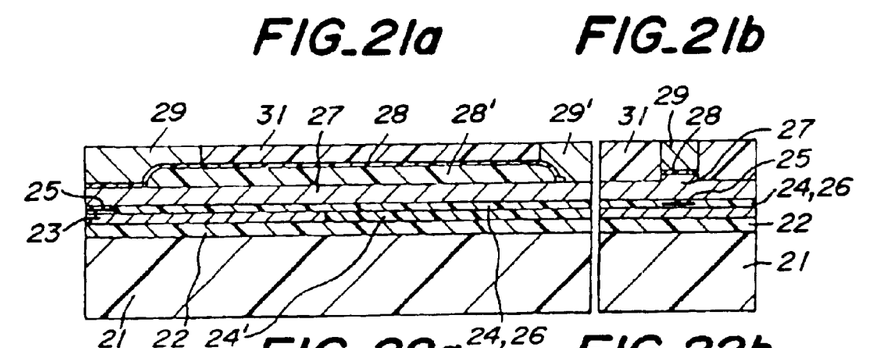
Figures 22A, 22B:
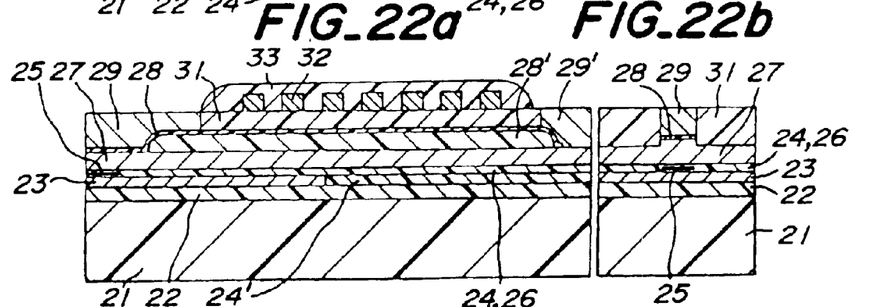
Figures 23A, 23B:
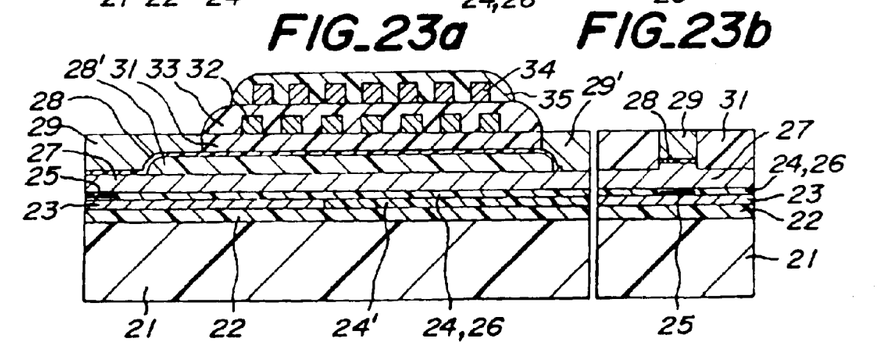
Figure 24A:
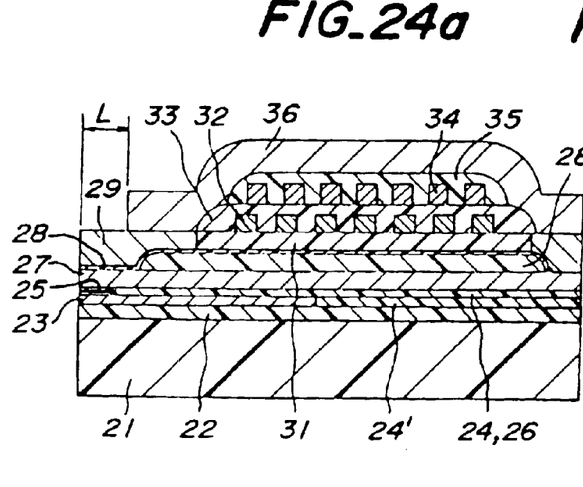
Figure 24B:
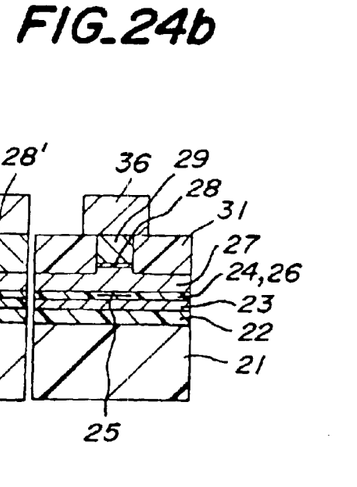
Figure 25:
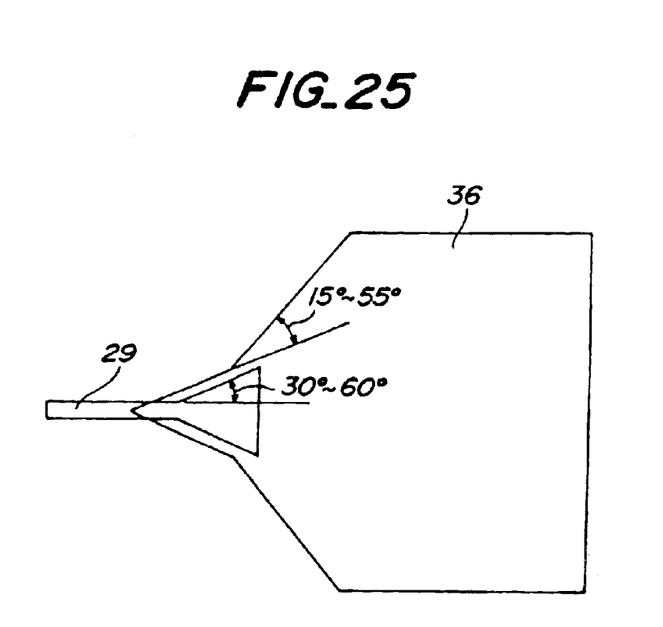
FIG. 25 is a plan view showing the shape of the suitable third magnetic layer to the shape of the second magnetic layer.

Moreover, the extended length h of the pole chip from pole portion to the rear side is preferably about 2–5 μm of the ring shaped insulating layer 28 which does not exceed its width, particularly, it is preferable to do as the thickness level of a top pole particularly desirable. Moreover, in FIG. 20, when the width angle of the pole chip in a rear region was assumed to be 90° (One side 45°) from the pole portion, it was showing the width widening angle is not the one of the best only to this but 180° or less. There are not any problems. Especially, a desirable range of the angle is 40–180°. In this way, as shown in FIG. 20, when the rear end of the pole chip has widened in the shape of fan, not only the saturation of the magnetic flux is not caused as described above, but also an accurate pattern edge according to photolithography can be controlled by enlarging the rear end, so that a more accurate control becomes possible from the throat height's TH. Moreover, in case of forming the pole chip 29 as described above, if a dummy pattern 29' for connecting a lower pole (the first magnetic layer) and an upper pole (the third magnetic layer) at the same time, an opening of through-hole becomes easy after CMP. As described above, after forming the second magnetic layer 29, as shown in FIGS. 21*a* and 21*b*, After forming for example alumina film 31 as the insulation layer is formed with the thickness of about 3 μm, the whole is smoothed by, for example, CMP. As shown in FIGS. 22*a* and 22*b* then, after forming the thin film coils 32 of the first layer consisting of for example copper on this insulation layer 31, insulative photoresist layer 33 is formed with the mask alignment of high accuracy. Subsequent, the whole is baked by the temperature of for example about 250° C. to make the surface smooth. Next, as shown in FIG. 23*a* and 23*b*, after forming thin film coils 34 of the second layer and then after forming photoresist layer 35 with highly accurate mask alignment on this thin film coil 34, it bakes at for example 250° C. to make the surface smooth again. Next, as shown in FIGS. 24*a* and 24*b*, the third magnetic layer 36 (upper pole) consisting of for example permalloy is selectively formed with thickness of 3 μm on the second magnetic layer 29 (pole chip), the photoresist layer 33 and 35 according to the desired pattern. In case of forming this third magnetic layer 36, as shown in FIG. 24*a*, it is suitable for its tip portion to form so as to retreat only distance L from the air bearing surface. The distance L is almost equal to the throat height TH. Composing in such a way, as described above, if a positional relation between the pole chip and the upper pole is shifted greatly to one side, seeing from the air bearing surface, data writing is caused even in the upper pole, a disadvantage of widening the width of the effective track is caused. However, there is an advantage that such a disadvantage comes might not generate if making the tip portion of the third magnetic layer is retreated from the air bearing surface. Moreover, hitherto, though the saturation of the magnetic flux is forced since the contact area of the pole chip and the upper pole decreases when the tip portion of the upper pole is located from the air bearing surface backward, however, in the present invention, since the contact area of both is secured enough in a rear region from the magnetic pole portion, so that the magnetic flux might not be saturated even if the tip portion of the upper pole is made retreated from the air bearing surface. Moreover, in case of forming the third magnetic layer 36, as shown in FIG. 20, it is preferable to make the shape along the shape of the second magnetic layer 29. In addition, as shown in FIG. 25, when the width angle of the second magnetic layer 29 is 30–60° and somewhat small, First, the third magnetic layer 36 is formed with a width widening angle: 30–60° so as to along the shape of the second magnetic layer, and then is formed with becoming a desired width angle. Thus, when the width of the third magnetic layer 36 is made wide as the magnetic layer is located away from the air bearing surface, and the third magnetic layer covers the second magnetic layer 29, even if a positioning error is caused between the pole chip 29 and upper pole 36, the change of contact area is few as a whole, so that the saturation of the magnetic flux does not generate. Moreover, this third magnetic layer 36 comes in contact with the first magnetic layer 27 at a rear position away from the magnetic pole portion through the dummy pattern 29', it is thin film coil 32 as for the closed magnetic path constituted with the first and the second and the third magnetic layer It is structure which passes 34 and comes off.

Next, as shown in FIGS. 26a and 26b, an overcoat layer 37 consisting of alumina or the like is deposited on the exposed surface of the third magnetic layer 36. Finally, the air bearing surface 38 opposed to the magnetic record medium is formed by grinding the side surface where the magnetic resistance layer 25 and the gap layer 28 are formed. In this case, the edge on the magnetic pole portion side of the photoresist insulation layer 28' is defined as a reference position to the air bearing surface, so that the throat height TH, the MR height MRH, and the apex angle e can be decided accurately as a desired design value. The present invention is not limited to the above embodiment and various changes and modifications may be performed. In the above described embodiment, for example, the thin film magnetic head is constructed as a composite type thin film magnetic head which is formed by stacking an induction type writing magnetic head and the reading magnetic head comprising an MR reproduction element, but this can also be constructed as induction type writing magnetic head.

Figure 28:
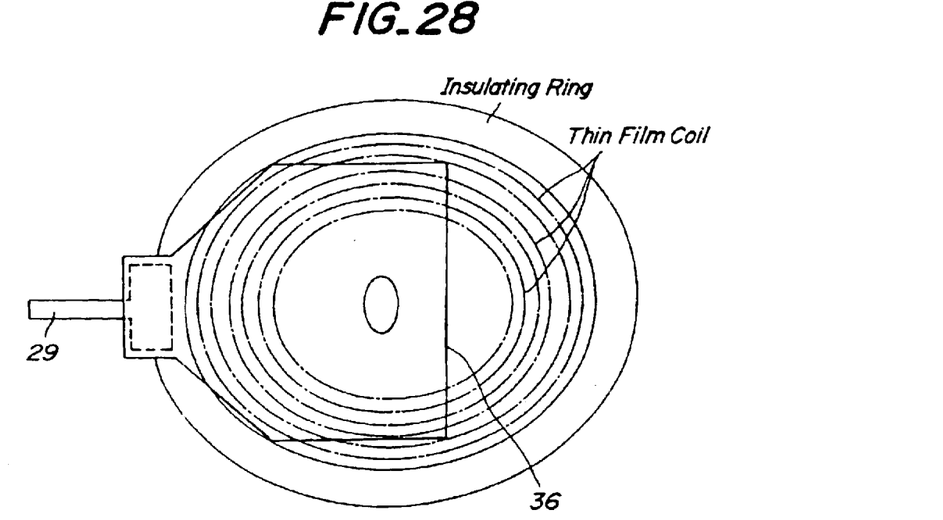
FIG. 28 is a diagrammatic plan view showing other embodiment of the thin film magnetic head according to the present invention, in which an extended angle of the portion rear the second magnetic layer is made 180°.
Figure 29:
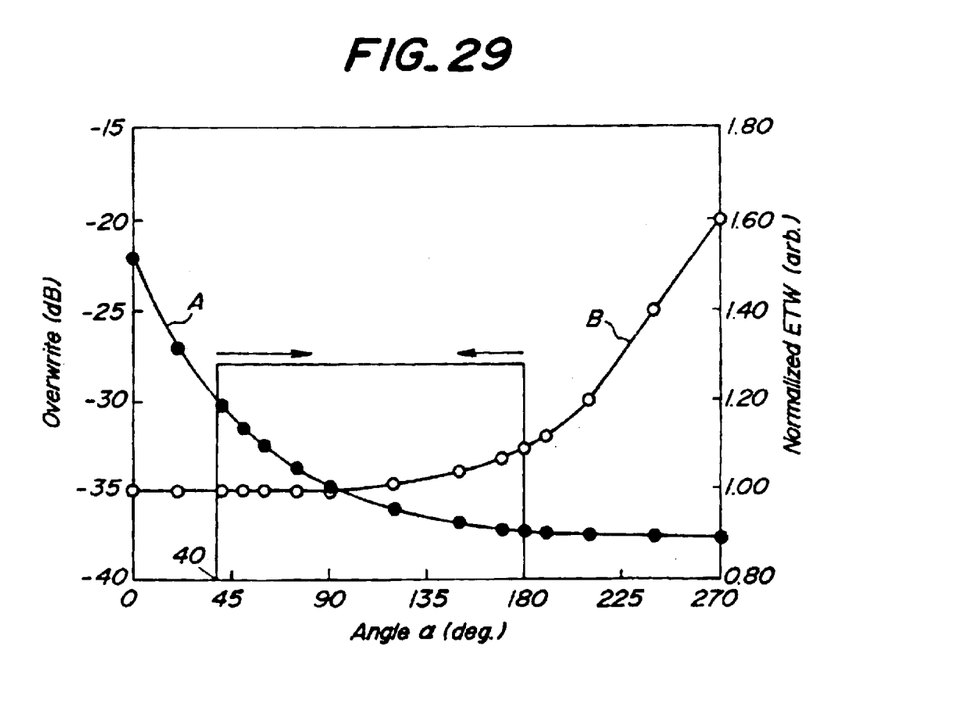
FIG. 29 is a graph showing the relation among the extending angle of a rear portion of the second magnetic layer, the overwrite characteristic, and the effective track width.

Moreover, in the above embodiment, the width of rear portion of the second magnetic layer and the tip portion of the third magnetic layer which is overlapped thereto is widened gradually as seen from the air bearing surface, but as shown in FIG. 28, the connection portion of the magnetic pole portion of the second magnetic layer 29 and the rear portion may be made a right-angle. In this case, the widening angle of rear portion of the second magnetic layer 29 may be 180°. Moreover, the shape of portion of the 3rd magnetic layer 36 overlapped to the rear portion of this second magnetic layer 29 is also registered to the shape of the rear portion with a certain width. FIG. 29 shows the change in the overwrite characteristic (curve A) obtained when the widening angle a of the rear portion of the second magnetic layer 29 is changed over a range of 0–270° and shows the change in width of the effective track width (curve B). That is, the overwrite characteristic is shown to a left vertical axis by the dB unit, and the normalized effective track width is plotted ton the right horizontal axis by arbitrary unit. In general, it is demanded to make the overwrite characteristic to be −30 dB or less, and the width of the effective track is allowed to the value to be originally obtained with extension up to 10% or less. Therefore, it is understood that the widening angle α of a rear part of the second magnetic layer 29 is 40–180° from curves A and B. In the present invention, as a material for the second magnetic layer, that is, the a pole chip, in addition to the above permalloy (Ni: 50 wt %, Fe: 50 wt %) and nitride iron (FeN), the materials of the high saturation magnetic flux density such as Fe—Cr—Zr system amorphous alloys and the Fe—C system amorphous alloys are advantageously adopted. Moreover, it is all right in any way to use these materials with two kinds or more. Moreover, as a material for the first and the third magnetic layers, in addition to the above permalloy (Ni: 80 wt %, Fe: 20 wt %), well-known various high saturation magnetic flux density materials can be suitably used.

In addition, as a material for the write gap layer, Oxide such as $Al_2O_3$, $SiO_2$ or the like, Nitride such as AlN, BN, SiN or the like, furthermore, electrically conductive and non magnetic substance such as Au, Cu, NiP or the like are used effectively.

Moreover, in the above example shown in the figure, it is explained chiefly described the case that the insulating layer, in which edge on the pole portion side became a reference position to the air bearing surface, is formed with the photoresist layer, but this insulating layer may be formed with the alumina layer, the silicon oxidation layer, and the silicon nitride layer, or the like.

According to the present invention, the second magnetic layer (pole chip) and the third magnetic layer (upper pole) have been touched at not only the pole portion but also it in a wide rear region therefrom, so that it is possible to reach the writing pole region effectively without saturating magnetism generated in the coil on the way, and thus a satisfactory writing characteristic can be obtained.

Moreover, according to the present invention, the insulating layer in which the edge on the pole portion side becomes a reference position to the air bearing surface is provided on the first magnetic layer, and if this insulating layer is covered with the write gap alumina layer, the insulating layer does not melt by heat-treating added at the time of forming the thin film coil, so that the throat height TH and the MR height MRH and furthermore, the apex angle θ can be formed according to a desired design value.

According to the present invention, the desired relation is always obtained between the MR height MRH and the throat height TH, so that the balance of the record head and the reproduction head can be kept in the best condition, and as a result, a composite type thin film magnetic head can be obtained with high performance.

In addition, according to the present invention, the tip portion of the third magnetic layer is made retreated from the air bearing surface. The contact portion of the third magnetic layer and the second magnetic layer is prevented from being exposed to the air bearing surface, so that even if as seen from the air bearing surface, mis-registration is caused in the position of a pole chip and an upper pole, the writing is performed by the upper pole, and thus the width of the effective track can be effectively prevented from being widened.

Moreover, further according to the invention, the contact area of an upper pole and the pole chip can be increased by the rear end of the second magnetic layer in the shape of fan, so that magnetic flux can be effectively prevented from being saturated in this portion.

Additionally, when the shape of the third magnetic layer is made wide, and the second magnetic layer is covered, even if the error is caused in the positional registration of both magnetic layers, the change of the contact area is little as a whole, so that magnetic flux can be prevented from being saturated.

What is claimed is:

1. A method of manufacturing a thin film magnetic head comprising:

forming a first magnetic layer having a pole portion on a base substrate;

forming a first insulating layer on the first magnetic layer;

forming a gap layer of a non-magnetic material on the first insulating layer and an exposed surface of the first magnetic layer which is not covered with the first insulating layer;

forming a second magnetic layer on the gap layer such that the second magnetic layer extends over the pole portion of the first magnetic layer and further extends over a rear portion of the first magnetic layer beyond the pole portion of the first magnetic layer;

forming a third insulating layer on the second magnetic layer and an exposed portion of the gap layer which is not covered with the second magnetic layer;

polishing the third insulating layer such that a pole portion of the second magnetic layer above the pole portion of the first magnetic layer is exposed and the exposed pole portion of the second magnetic layer forms a coplanar surface with the third insulating layer;

forming a thin film coil such that a part of the thin film coil is formed on the coplanar surface of the pole portion of the second magnetic layer and the third insulating layer and is isolated by a second insulating layer;

forming a third magnetic layer on the pole portion of the second magnetic layer and the second insulating layer such that the third magnetic layer is magnetically coupled to the first magnetic layer at a rear portion remote from the pole portion; and forming the air bearing surface by grinding end surfaces of the pole portions of the first and second magnetic layer and an end surface of the gap layer placed therebetween, while an end edge of said first insulating layer on a side of the pole portion of the first magnetic layer is utilized as a throat height zero reference position.

2. The method of manufacturing a thin film magnetic head as claimed in claim 1, comprising:

widening the width of the second magnetic layer at the region beyond the pole portion.

3. The method of manufacturing a thin film magnetic head as claimed in claim 1, wherein the grinding process of the third insulation layer is performed by a chemical-mechanical grinding process.

4. The method of manufacturing a thin film magnetic head as claimed in claim 1, wherein after forming the second magnetic layer, the method comprises:

performing an etching treatment with the pole portion of the first magnetic layer as a mask to partially remove a portion of a film thickness of the first magnetic layer to form a trim structure.

5. The method of manufacturing a thin film magnetic head as claimed in claim 1, comprising:

arranging an electrically insulated and magnetically shielded magnetoresistive reproducing element in a magnetic resistant material film between the base substrate and the first magnetic layer so as to form a composite thin film magnetic head.

6. The method of manufacturing a thin film magnetic head as claimed in claim 5, wherein the method further comprises:

forming a first shield layer that magnetically shields the base substrate;

embedding the magnetic resistance material film between the first shield layer and a second shield layer that is formed over the magnetic resistant material film and below the first magnetic layer; and applying a grinding process to form the air bearing surface and the magnetoresistive reproducing element which is arranged so as to expose its end face on the air bearing surface by grinding the first shield layer and the magnetic resistance material film.

* * * * *